(12) United States Patent
Nagai et al.

(10) Patent No.: US 12,081,686 B2
(45) Date of Patent: Sep. 3, 2024

(54) HINGE MECHANISM AND FOLDABLE MOBILE TERMINAL

(71) Applicants: Huawei Technologies Co., Ltd., Shenzhen (CN); STAF CORPORATION, Kanagawa (JP)

(72) Inventors: Kenji Nagai, Yokohama (JP); Shinichi Koarata, Yokohama (JP); Yake Zou, Yokohama (JP); Tomoaki Kai, Yokohama (JP)

(73) Assignees: Huawei Technologies Co., Ltd., Shenzhen (CN); STAF CORPORATION, Yokohama (JP)

( * ) Notice: Subject to any disclaimer, the term of this patent is extended or adjusted under 35 U.S.C. 154(b) by 336 days.

(21) Appl. No.: 17/561,403

(22) Filed: Dec. 23, 2021

(65) Prior Publication Data

US 2022/0116489 A1    Apr. 14, 2022

Related U.S. Application Data (63) Continuation of application No. PCT/CN2020/098340, filed on Jun. 27, 2020.

(30) Foreign Application Priority Data

Jun. 27, 2019 (CN) .......................... 201910569376.7

(51) Int. Cl.
*H04M 1/02* (2006.01)
(52) U.S. Cl.
CPC ................................ *H04M 1/0216* (2013.01)

(58) Field of Classification Search
CPC ...... F16C 11/04; G06F 1/1641; G06F 1/1652; G06F 1/1681; H04M 1/0216; H04M 1/022; H04M 1/0268
(Continued)

(56) References Cited

U.S. PATENT DOCUMENTS 10,036,188 B1    7/2018   Yao et al.
10,143,098 B1    11/2018  Lee
(Continued)

FOREIGN PATENT DOCUMENTS

CN    202926863 U    5/2013
CN    203632709 U    6/2014
(Continued)

*Primary Examiner* — Tan H Trinh
(74) *Attorney, Agent, or Firm* — Leydig, Voit & Mayer, Ltd.

(57) ABSTRACT

Embodiments provide a hinge mechanism and a foldable mobile terminal. A swing arm component and a synchronization component are disposed on both sides of a main shaft component of the hinge mechanism, so that when a swing arm rotates around the main shaft component, a synchronization arm on a same side as the swing arm rotates accordingly to drive a synchronization arm and a swing arm on the other side to rotate, and further, housings on both sides of the foldable mobile terminal including the main shaft component can move synchronously, and force of a flexible screen is relatively even. In addition, because swing arms on both sides of the main shaft component rotate around different axes, through such a design, accommodation space that can accommodate the flexible screen can be formed during rotation of the swing arms, so that damage to the flexible screen is reduced.

19 Claims, 8 Drawing Sheets

(58) Field of Classification Search
USPC ........................................................ 455/575.3
See application file for complete search history.

(56) References Cited

U.S. PATENT DOCUMENTS

| | | | | |
|---|---|---|---|---|
| 11,336,759 B2* | 5/2022 | Liao | ...................... | H04M 1/022 |
| 2014/0033477 A1* | 2/2014 | Wang | .................... | G06F 1/1681 |
| | | | | 16/376 |
| 2014/0165335 A1* | 6/2014 | Zhang | .................. | G06F 1/1681 |
| | | | | 16/386 |
| 2021/0368032 A1* | 11/2021 | Liao | ...................... | G06F 1/1681 |
| 2022/0303371 A1* | 9/2022 | Liao | ...................... | G06F 1/1616 |

FOREIGN PATENT DOCUMENTS

| | | | | |
|---|---|---|---|---|
| CN | 204103961 U | 1/2015 | | |
| CN | 105491193 A | 4/2016 | | |
| CN | 106205385 A | 12/2016 | | |
| CN | 106873717 A | 6/2017 | | |
| CN | 108712535 A | 10/2018 | | |
| CN | 109469680 A | 3/2019 | | |
| CN | 208609020 U | 3/2019 | | |
| CN | 208656822 U | 3/2019 | | |
| CN | 109658827 A | 4/2019 | | |
| CN | 208686793 U | 4/2019 | | |
| CN | 208689845 U | 4/2019 | | |
| CN | 108648624 B | 9/2020 | | |
| KR | 20190013992 A | 2/2019 | | |
| WO | 2013080191 A2 | 6/2013 | | |
| WO | 2019109858 A1 | 6/2019 | | |
| WO | WO 2020186889 | * | 9/2020 | .............. H04M 1/02 |

* cited by examiner

HINGE MECHANISM AND FOLDABLE MOBILE TERMINAL

CROSS-REFERENCE TO RELATED APPLICATIONS

This application is a continuation of International Application No. PCT/CN2020/098340, filed on Jun. 27, 2020, which claims priority to Chinese Patent Application No. 201910569376.7, filed on Jun. 27, 2019. The disclosures of the aforementioned applications are hereby incorporated by reference in their entireties.

TECHNICAL FIELD

This application relates to the field of terminal technologies, and in particular, to a hinge mechanism and a foldable mobile terminal.

BACKGROUND

As a flexible display screen technology becomes gradually mature, a display manner of a terminal device is greatly changed, and a foldable flexible screen mobile phone is an important evolution direction of mobile phone differentiation in the future. Because a display screen of the foldable flexible screen mobile phone features a display mode that can be flexibly switched based on different usage scenarios, the foldable flexible screen mobile phone is certainly to become a main direction of next-generation mobile phone development of a mainstream device manufacturer. In the future, the foldable flexible screen mobile phone is to become a major selling point of a terminal product.

Because a flexible screen and a folding hinge are the key to a foldable flexible screen mobile phone technology, and the flexible screen is a relatively fragile component, if pressure or tension applied to parts of the flexible screen is uneven in a folding process, the flexible screen may be very likely to be deformed and damaged. In this case, the folding hinge not only needs to be able to rotate by 180° in ultra-thin accommodation space, but also needs to cooperate with a feature of the flexible screen, so that force on the flexible screen is even.

SUMMARY

Embodiments of this application provide a hinge mechanism and a foldable mobile terminal, so that force on a flexible screen is even and a service life of the flexible screen is prolonged.

According to a first aspect, a hinge mechanism is provided. The hinge mechanism may be applied to a foldable mobile terminal, and is used as a folding mechanism of the mobile terminal. The hinge mechanism is separately fastened to two housings of the mobile terminal, and when the mobile terminal is folded, the two housings may rotate around the hinge mechanism to implement folding. The hinge mechanism mainly includes three parts: a main shaft component, a swing arm component, and a synchronization component. The main shaft component functions as a hinge. The swing arm component includes at least one swing arm group. Each swing arm group includes swing arms correspondingly disposed on both sides of the main shaft component, the swing arm is rotatably connected to the main shaft component, and axes around which the swing arms on both sides of the main shaft component rotate are different and are separately parallel to an extension direction of the main shaft component. The synchronization component and the swing arm component are correspondingly disposed, the synchronization component includes synchronization arms separately disposed on both sides of the main shaft component, and two synchronization arms are geared; and each synchronization arm is slidably connected to a swing arm on a same side as the synchronization arm, and may rotate with the swing arm on the corresponding side. Because the synchronization arms on both sides of the main shaft component are geared, rotation of a synchronization arm on one side drives a synchronization arm on the other side to simultaneously rotate. In addition, a synchronization arm and a swing arm on a same side are slidably connected. Therefore, when a swing arm on one side rotates relative to the main shaft component, a synchronization arm on the same side rotates accordingly to drive a synchronization arm and a swing arm on the other side to rotate, so that the housings on both sides of the foldable mobile terminal including the main shaft component can move synchronously, and therefore, both sides of a flexible screen move synchronously, and force of the flexible screen is relatively even. In addition, because swing arms on both sides of the main shaft component rotate around different axes, through such a design, accommodation space that can accommodate the flexible screen can be formed during rotation of the swing arms, so that damage to the flexible screen is reduced.

When rotation axes of the swing arm and the synchronization arm are specifically disposed, axes around which a swing arm and a synchronization arm disposed on a same side rotate coincide, so that a structure of the rotation mechanism is simplified.

In an embodiment, in the extension direction of the main shaft component, swing arms are disposed in a one-to-one correspondence with synchronization arms, or one synchronization arm is disposed at each end of the swing arm; and when the swing arm is slidably connected to a synchronization arm on a same side as the swing arm, a strip-shaped hole is disposed in the synchronization arm, an extension direction of the strip-shaped hole is the same as an extension direction of the synchronization arm, and a sliding part that can slide along the strip-shaped hole is disposed in the swing arm. When the sliding part is specifically disposed, the sliding part may be a fastening rod disposed in the swing arm. In this case, when the swing arm rotates, the sliding part slides along the strip-shaped hole, and also drives a synchronization arm on a same side as the swing arm to rotate.

In an embodiment, an elastic component is further disposed between the swing arm and the synchronization arm, to form unfolding/folding torque between the swing arm and the synchronization arm. In this case, a plurality of limiting grooves are disposed on a sidewall that is of the synchronization arm and that faces the swing arm. The elastic component is disposed between a swing arm and a synchronization arm on a same side as the elastic component, and includes two parts abutting against each other, and the two parts are a ball and an elastic mechanical part. One end of the elastic mechanical part abuts against the swing arm and the other end abuts against the ball, and the ball may roll along a sidewall that is of the synchronization arm and that is close to the swing arm. When a folding status of the foldable mobile terminal including the hinge mechanism changes, the swing arm rotates around the main shaft component, and the synchronization arm rotates accordingly. In addition, the ball may roll along the sidewall of the synchronization arm under an action of elastic force, and friction occurs between the ball and the sidewall of the synchronization arm, so that damping force is generated between the swing arm and the synchronization arm, thereby improving user experience. In addition, because there are a plurality of limiting grooves on the sidewall that is of the synchronization arm and that is close to the swing arm, in a rolling process, the ball falls into the limiting groove under an action of the elastic mechanical part, so that hover experience can be achieved.

When the swing arm is specifically connected to the elastic component, an accommodation groove for accommodating the elastic mechanical part may be disposed in the swing arm. In this case, the elastic mechanical part may be accommodated in the accommodation groove and abut against a bottom of the accommodation groove.

The elastic mechanical part may be but is not limited to a spring. When the elastic mechanical part is a spring, to limit the spring to prevent the spring from being bent in a moving process, a limiting pillar may be disposed in the accommodation groove, so that the spring sleeves the limiting pillar. In addition, there may be one spring, or there may be a plurality of springs disposed in parallel. When there are a plurality of springs disposed in parallel, ends that are of the plurality of springs and that are close to the synchronization arm are connected by using a U-shaped connector. In this case, the ball abuts against an end face of the U-shaped connector, and moves along the end face of the U-shaped connector. In this way, friction between the elastic mechanical part and the ball can be reduced, so that the ball moves more flexibly.

When the swing arm is specifically connected to the main shaft component, a swing arm mounting groove is disposed in the main shaft component, a protrusion is disposed on a wall of the swing arm mounting groove, and the protrusion has an arc-shaped support surface. A support shaft is disposed at an end that is of the swing arm and that is connected to the main shaft component, and the support shaft is in contact with the arc-shaped support surface, and may rotate along the arc-shaped support surface. In this way, the swing arm is rotatably connected to the main shaft component. In addition, alternatively, the swing arm may be rotatably connected to the main shaft component through hinging, pivoting, or the like.

To form accommodation space that has a flat surface and that is used to accommodate the flexible screen, in a possible implementation, the hinge mechanism further includes baffles separately disposed on both sides of the main shaft component, and a V-shaped hole is also disposed in the synchronization arm. The baffle includes a body and a connection part connected to the body, an extension direction of the baffle is parallel to the extension direction of the main shaft component, and an extension direction of the connection part is perpendicular to the extension direction of the body. An end that is of the connection part and that is away from the body is rotatably connected to the swing arm by using a rotating pin shaft, and an end that is of the connection part and that is close to the body is connected to the swing arm by using a driving pin shaft. The swing arm rotates to enable the driving pin shaft to move along the V-shaped hole, to drive the connection part to rotate around the rotating pin shaft, so that the body rises or falls accordingly, and further, the accommodation space for accommodating the flexible screen can be formed by the main shaft component and bodies on both sides in a folding process of the foldable mobile terminal and the accommodation space has a relatively flat surface, thereby reducing damage to the flexible screen.

According to a second aspect, a foldable mobile terminal is provided. The mobile terminal includes any possible hinge mechanism in the first aspect, two housings, and a flexible screen fastened to the two housings, the two housings are separately disposed on both sides of the hinge mechanism, and each housing is fastened to a swing arm on a same side as the housing. During use of the mobile terminal, when rotation of a housing on one side drives a swing arm to rotate around the main shaft component, a synchronization arm on the same side rotates accordingly, so that a synchronization arm and a swing arm on the other side are driven to rotate, and further, the housings on both sides of the foldable mobile terminal can move synchronously, and therefore, both sides of the flexible screen move synchronously, and force of the flexible screen is relatively even. In addition, because swing arms on both sides of the main shaft component rotate around different axes, through such a design, accommodation space that can accommodate the flexible screen can be formed during rotation of the swing arms, so that a probability that the flexible screen is damaged can be reduced.

When the housing is specifically connected to the swing arm, a bracket may be disposed between the housing and the swing arm, the bracket is fastened to the swing arm, and then the housing and the bracket are fastened, so that the housing is connected to the swing arm.

In an embodiment, the mobile terminal further includes an appearance protection part, and the appearance protection part is disposed on a folding outer side of the mobile terminal, and is fastened to brackets on both sides of the main shaft component by using elastic mechanisms. In a folding process of the foldable mobile terminal, the appearance protection part and the two housings fit with the hinge mechanism, so that an appearance of the foldable mobile terminal is simple and beautiful while the hinge mechanism is protected.

DESCRIPTION OF EMBODIMENTS

To make objectives, technical solutions, and advantages of this application clearer, the following further describes this application in detail with reference to the accompanying drawings.

Figure 2:
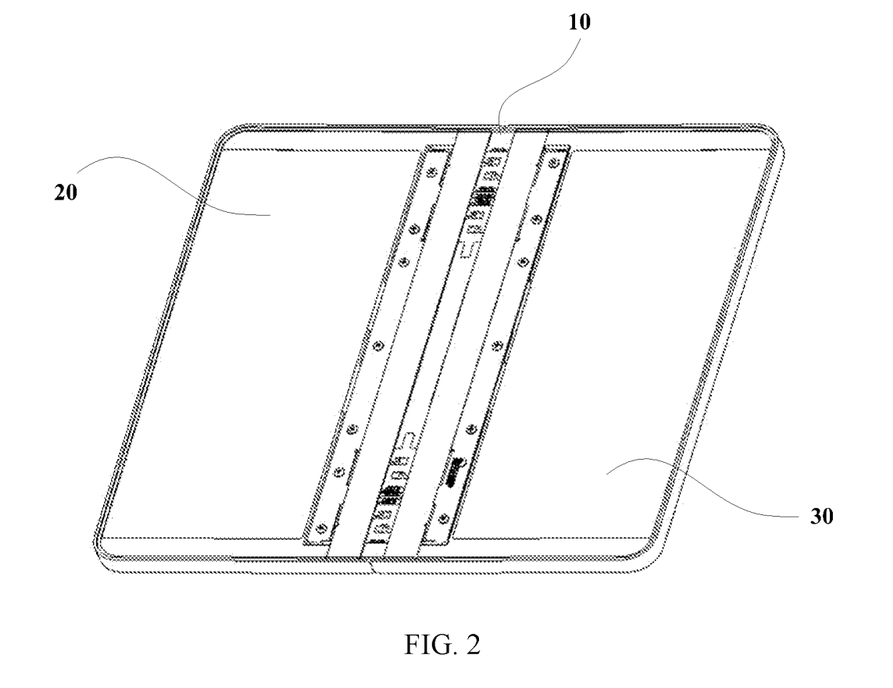
FIG. 2 is a schematic diagram of a structure in which a foldable mobile terminal is unfolded by an angle of 180° according to an embodiment of this application.
Figure 3:
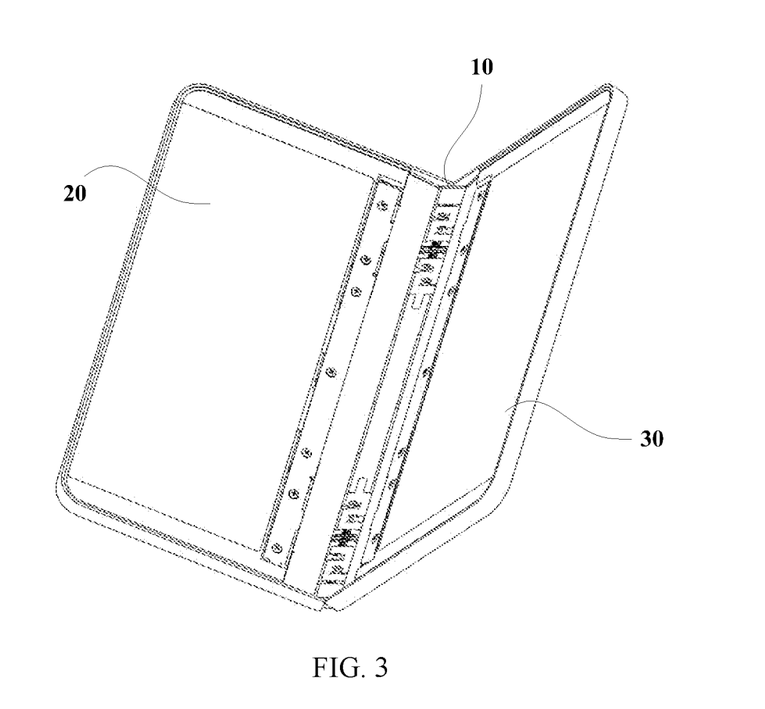
FIG. 3 is a schematic diagram of a structure in which a foldable mobile terminal is unfolded by an angle of 90° according to an embodiment of this application.
Figure 4:
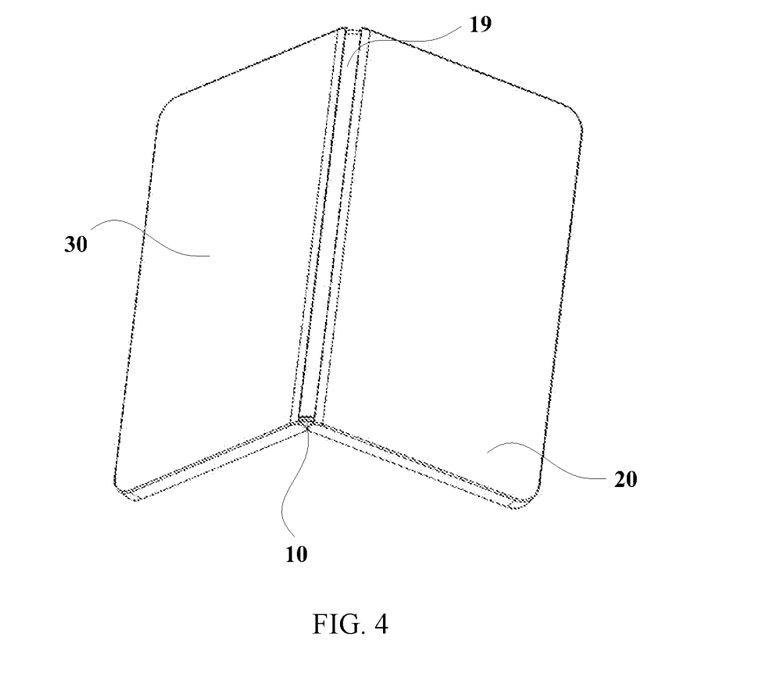
FIG. 4 is a schematic diagram of a structure in which a foldable mobile terminal is unfolded by an angle of 90° according to another embodiment of this application.
Figure 5:
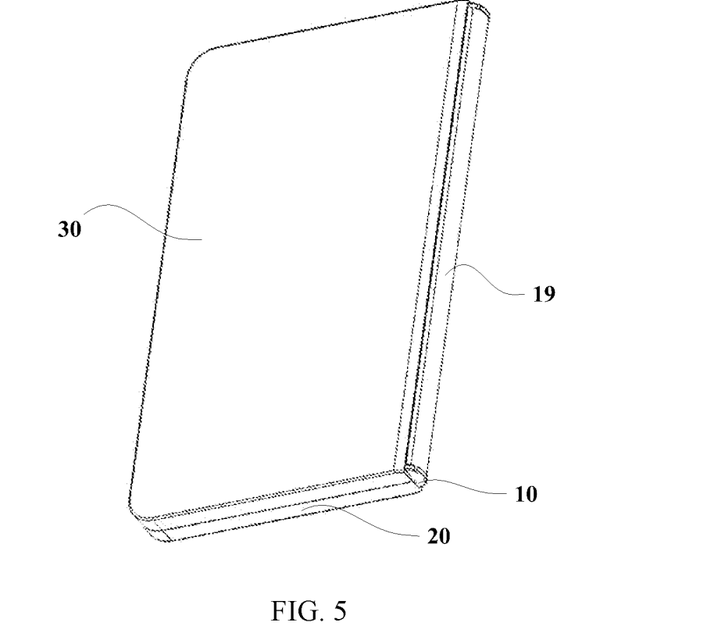
FIG. 5 is a schematic diagram of a state in which a foldable mobile terminal is folded according to an embodiment of this application.

For ease of understanding of a hinge mechanism provided in the embodiments of this application, the following first describes an application scenario of the hinge mechanism. The hinge mechanism may be applied to a mobile terminal, especially a mobile terminal with a foldable screen, for example, a mobile phone, a personal digital assistant (PDA), a notebook computer, or a tablet computer. Each mobile terminal to which the embodiments of this application are applied includes a structure shown in FIG. 1: a left housing 20, a hinge mechanism 10, a right housing 30, and a flexible screen 40. When being in use, the mobile terminal may be folded and unfolded based on different usage scenarios. FIG. 2 shows a state in which an included angle between the left housing and the right housing of the mobile terminal is 180°. FIG. 3 and FIG. 4 show states in which the left housing 20 and the right housing 30 of the mobile terminal are folded by an included angle of 90°. FIG. 5 shows a state in which the left housing 20 and the right housing 30 of the mobile terminal are folded by an included angle of 0°. An unfolding and folding process of the mobile terminal is a process in which the left housing 20 and the right housing 30 rotate around the hinge mechanism 10. For ease of understanding of the hinge mechanism 10 provided in the embodiments of this application, the following describes a structure of the hinge mechanism 10 in detail with reference to the accompanying drawings.

Figure 1:
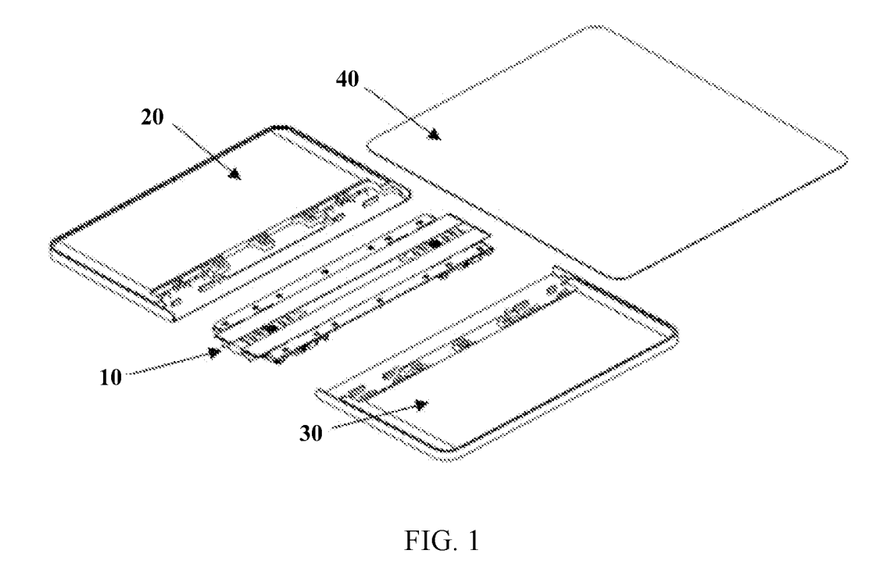
FIG. 1 is a schematic diagram of an exploded structure of a foldable mobile terminal according to an embodiment of this application.
Figure 6:
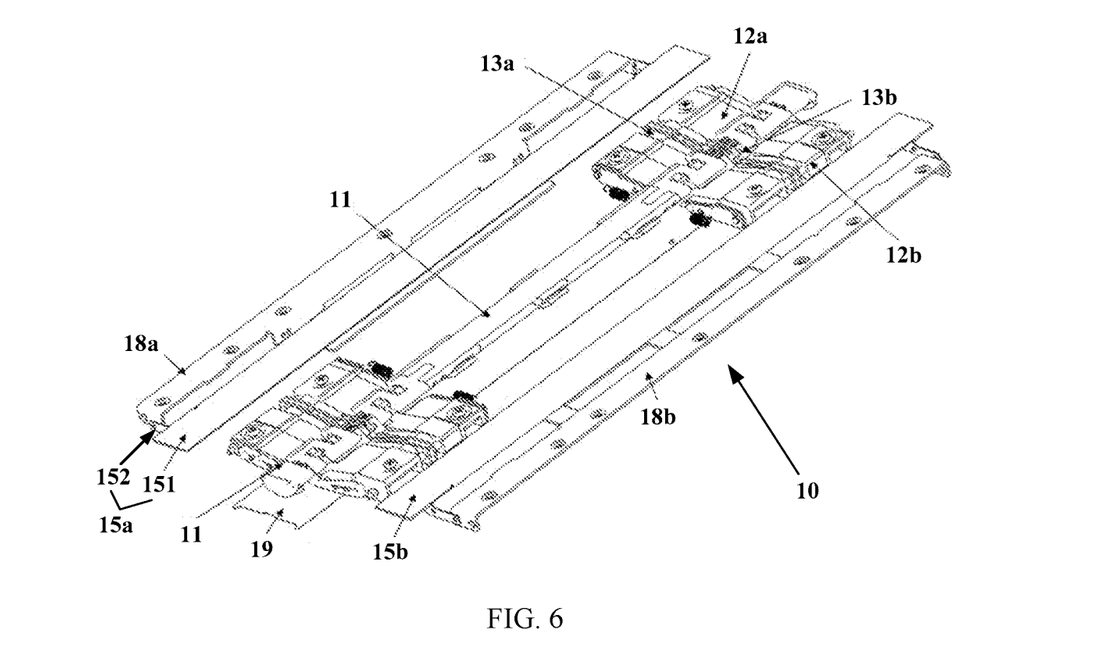
FIG. 6 is a schematic diagram of an exploded structure of a hinge mechanism according to an embodiment of this application.

First, referring to FIG. 1 and FIG. 6, the hinge mechanism 10 provided in the embodiments of this application mainly includes a main shaft component 11, a swing arm component, and a synchronization component. The main shaft component 11 is a support part, and also functions as a rotating shaft. The swing arm component is rotatably connected to the main shaft component 11, and the swing arm component is connected to the housing of the foldable mobile terminal. The swing arm component may be used as an active rotating part of the hinge mechanism 10 to drive the synchronization component to rotate. The following describes the components of the hinge mechanism 10 in detail with reference to the accompanying drawings.

When the main shaft component 11 is specifically disposed, the main shaft component 11 may have different structures. Referring to FIG. 6, an overall structure of the main shaft component 11 provided in the embodiments of this application may be a shape of half a cylinder. However, it should be understood that the shape of the main shaft component 11 is merely a specific example, and the main shaft component 11 provided in the embodiments of this application may have another structural form. For ease of description, an extension direction of the main shaft component 11 is defined. As shown in FIG. 6, the extension direction of the main shaft component 11 is a direction of an axis around which the left housing 20 and the right housing 30 in FIG. 1 rotate. In addition, when the main shaft component 11 supports the swing arm component, a structure corresponding to the swing arm component is disposed in the main shaft component 11. For ease of understanding of an internal structure of the main shaft component 11, the following describes a structure of the main shaft component 11 with reference to the swing arm component.

Figure 7:
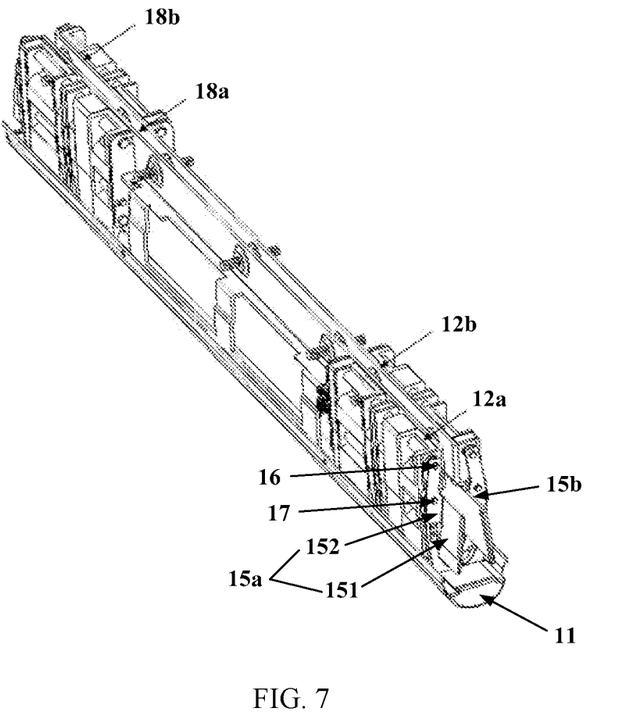
FIG. 7 is a schematic diagram of a state in which a hinge mechanism is folded according to an embodiment of this application.

Referring to FIG. 1, when the swing arm component is specifically disposed, the swing arm component includes a swing arm group, and the swing arm group is configured to connect the left housing 20 and the right housing 30. A quantity of swing arm groups may be determined based on a requirement. For example, one swing arm group is disposed at each end of the main shaft component 11, or as shown in FIG. 6 and FIG. 7, two swing arm groups are disposed at each end of the main shaft component 11, or more swing arm groups may be disposed based on a specific requirement.

When the swing arm group is specifically disposed, referring to FIG. 6, each swing arm group includes swing arms correspondingly disposed on both sides of the main shaft component 11. For ease of description, two swing arms are named a left swing arm 12a and a right swing arm 12b, where the left swing arm 12a and the right swing arm 12b are respectively configured to be fastened to the left housing 20 and the right housing 30 of the mobile terminal shown in FIG. 1. Referring to FIG. 1 and FIG. 6 together, the left swing arm 12a is fastened to the left housing 20, and the right swing arm 12b is fastened to the right housing 30. When fastening is specifically implemented, for example, a fastener such as a bolt or a screw may be used for fastening. In this case, the left swing arm 12a and the right swing arm 12b respectively move synchronously with the left housing 20 and the right housing 30. When the left swing arm 12a and the right swing arm 12b are specifically disposed, the left swing arm 12a and the right swing arm 12b are disposed on both sides of the main shaft component 11. More specifically, the left swing arm 12a and the right swing arm 12b may be separately arranged on both sides of the main shaft component 11 in the extension direction of the main shaft component 11. A manner of connecting the left swing arm 12a to the main shaft component 11, the housing, and another possible structure is the same as that of connecting the right swing arm 12b to the main shaft component 11, the housing, and another possible structure. Therefore, the following uses the left swing arm 12a as an example for description.

Still referring to FIG. 6, when the left swing arm 12a is specifically connected to the main shaft component 11, the left swing arm 12a is rotatably connected to the main shaft component 11. In addition, an axis around which the left swing arm 12a rotates is different from an axis around which the right swing arm 12b rotates. However, both the axis around which the left swing arm 12a rotates and the axis around which the corresponding right swing arm 12b rotates are parallel to the extension direction of the main shaft component 11, so that water drop-like accommodation space 22 (refer to FIG. 13) that can accommodate the flexible screen 40 shown in FIG. 1 can be formed during rotation of the left swing arm 12a and the right swing arm 12b.

Figure 8:
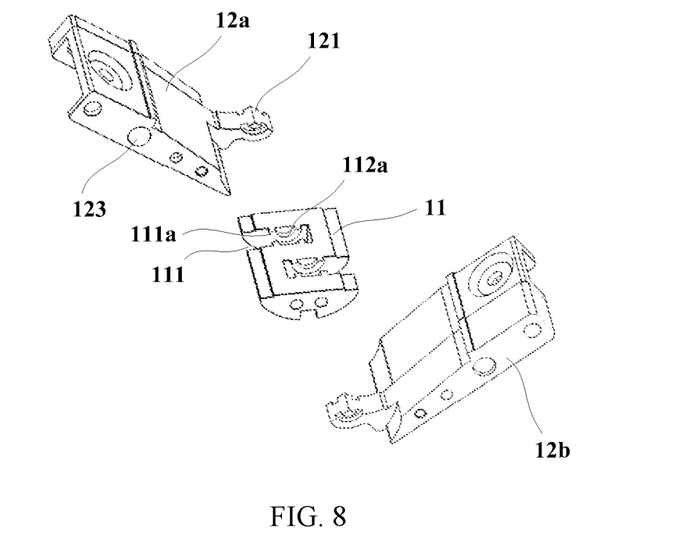
FIG. 8 is a schematic diagram of an exploded structure in which a swing arm is connected to a main shaft component according to an embodiment of this application.

FIG. 8 shows a specific structure in which the left swing arm 12a is rotatably connected to the main shaft component 11. A swing arm mounting groove 111 is disposed in the main shaft component 11, a protrusion 111a is disposed on a wall of the swing arm mounting groove 111, and the protrusion 111a has an arc-shaped support surface 112a. A support shaft 121 is disposed at an end that is of the left swing arm 12a and that is connected to the main shaft component 11, and the support shaft 121 is in contact with the arc-shaped support surface 112a, and may rotate along the arc-shaped support surface 112a. In this way, the left swing arm 12a is rotatably connected to the main shaft component 11. It should be understood that a connection structure between the left swing arm 12a and the main shaft component 11 is disposed merely as an example, and the swing arm component may be alternatively connected to the main shaft component 11 through hinging or the like.

Figure 9:
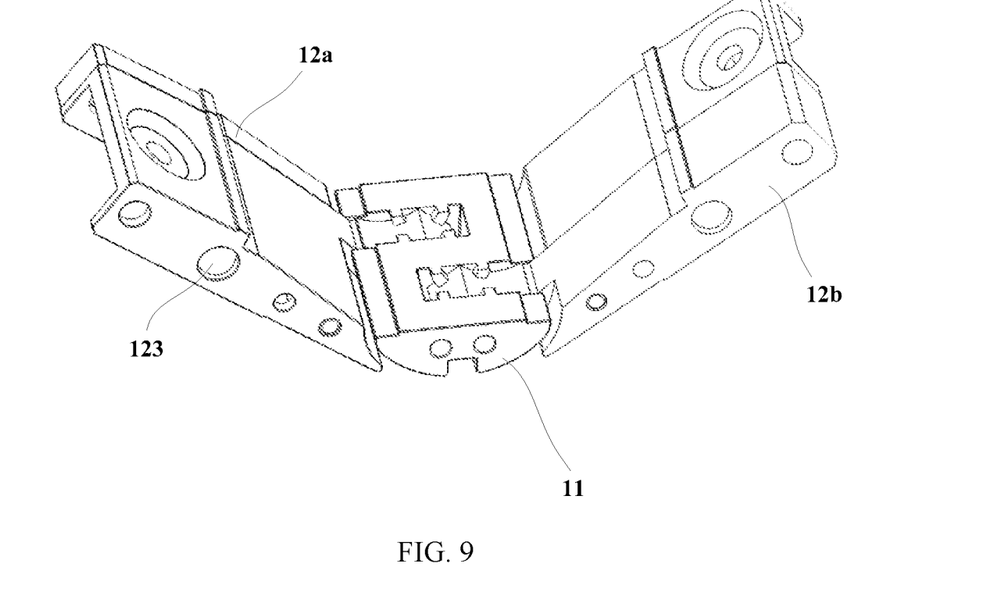
FIG. 9 is a schematic diagram of a structure in which a swing arm is connected to a main shaft component according to an embodiment of this application.

Still referring to FIG. 8, when the right swing arm 12b is specifically disposed, the right swing arm 12b is connected to the main shaft component 11 in a same manner as the left swing arm 12a. Therefore, details are not described herein again. However, when the left swing arm 12a and the right swing arm 12b are separately connected to the main shaft component 11, swing arm mounting grooves 111 in the main shaft component 11 that correspond to the two swing arms may be disposed opposite to each other, or may be alternately disposed, as shown in FIG. 9, provided that the left swing arm 12a and the right swing arm 12b can rotate around different axes.

Figure 10:
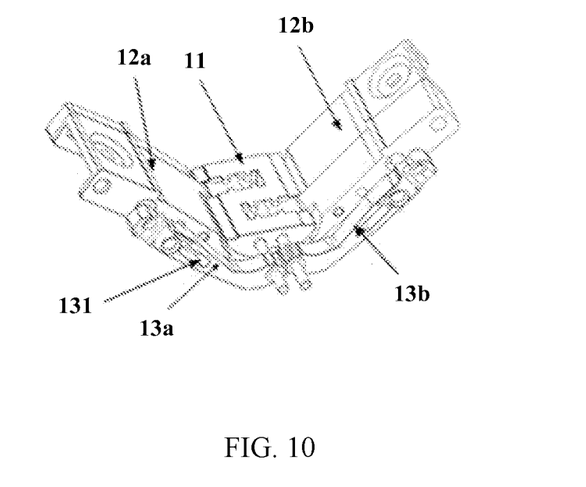
FIG. 10 is a schematic diagram of a structure in which a synchronization arm is connected to a main shaft component according to an embodiment of this application.
Figure 14:
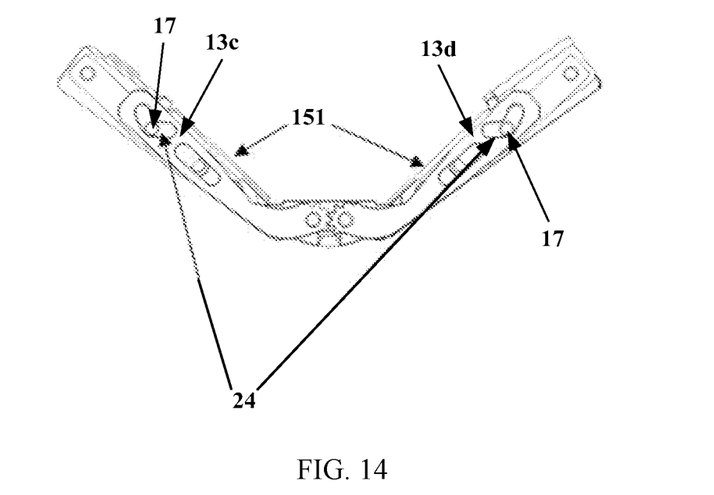
FIG. 14 is a side view of a hinge mechanism in a semi-folded state according to another embodiment of this application.

Referring to FIG. 10, when the synchronization component is specifically disposed, the synchronization component and the swing arm component may be correspondingly disposed, and the synchronization component includes synchronization arms separately disposed on both sides of the main shaft component 11. "correspondingly disposed" herein may mean that one group of synchronization arms are correspondingly disposed for one swing arm group or two groups of synchronization arms are correspondingly disposed for one swing arm group. The two groups of synchronization arms are separately disposed at both ends of the swing arm in the extension direction of the main shaft component, and the two groups of synchronization arms disposed at both ends of the swing arm may be the same or different. For example, one group of synchronization arms shown in FIG. 10 is disposed at one end of the swing arm, and one group of synchronization arms shown in FIG. 14 is disposed at the other end. Two synchronization arms are geared, and each synchronization arm is slidably connected to a swing arm on a same side as the synchronization arm, and may rotate with the swing arm on the corresponding side. Similarly, for ease of description, a synchronization arm disposed on a same side as the left swing arm 12a is referred to as a left synchronization arm 13a, and a synchronization arm disposed on a same side as the right swing arm 12b is referred to as a right synchronization arm 13b. A manner of connecting the left synchronization arm 13a to the main shaft component 11, the swing arm on the same side as the left synchronization arm 13a, and another possible structure is the same as that of connecting the right synchronization arm 13b to the main shaft component 11, the swing arm on the same side as the right synchronization arm 13b, and another possible structure. Therefore, the following uses only the left synchronization arm 13a as an example for description.

Still referring to FIG. 10, when the left synchronization arm 13a is specifically disposed, an axis of the main shaft component 11 around which the left synchronization arm 13a rotate may be disposed based on a requirement. In the embodiment shown in FIG. 10, the axis around which the left synchronization arm 13a rotates coincides with the axis around which the left swing arm 12a rotates, so that a structure of the rotation mechanism 10 shown in FIG. 6 can be simplified. It may be understood that the axis around which the left synchronization arm 13a rotates may be alternatively set in another manner, provided that the left synchronization arm 13a can effectively shun the flexible screen 40 shown in FIG. 1, so that the flexible screen 40 can be accommodated in the accommodation space 22 (refer to FIG. 13) that can accommodate the flexible screen and that is formed through rotation of the left swing arm 12a and the right swing arm 12b.

Still referring to FIG. 10, when the right synchronization arm 13b is specifically disposed, the right synchronization arm 13b is connected to the main shaft component 11 in a same manner as the left synchronization arm 13a. Therefore, details are not described herein again. Because the synchronization arm is slidably connected to a swing arm on a same side as the synchronization arm, and the synchronization arm may rotate with the swing arm, it may be understood that when the synchronization arm rotates, the swing arm may also rotate with the synchronization arm. In this case, for example, the left swing arm 12a is used as an active rotating part. When the left swing arm 12a rotates relative to the main shaft component 11, the left synchronization arm 13a rotates accordingly. Because the left synchronization arm 13a is geared to the right synchronization arm 13b, rotation of the left synchronization arm 13a drives the right synchronization arm 13b and the right swing arm 12b to rotate, and with reference to FIG. 1, the left housing 20 and the right housing 30 of the foldable mobile terminal including the hinge mechanism 10 can move synchronously, so that both sides of the flexible screen 40 move synchronously, and force of the flexible screen 40 is relatively even.

Figure 11:
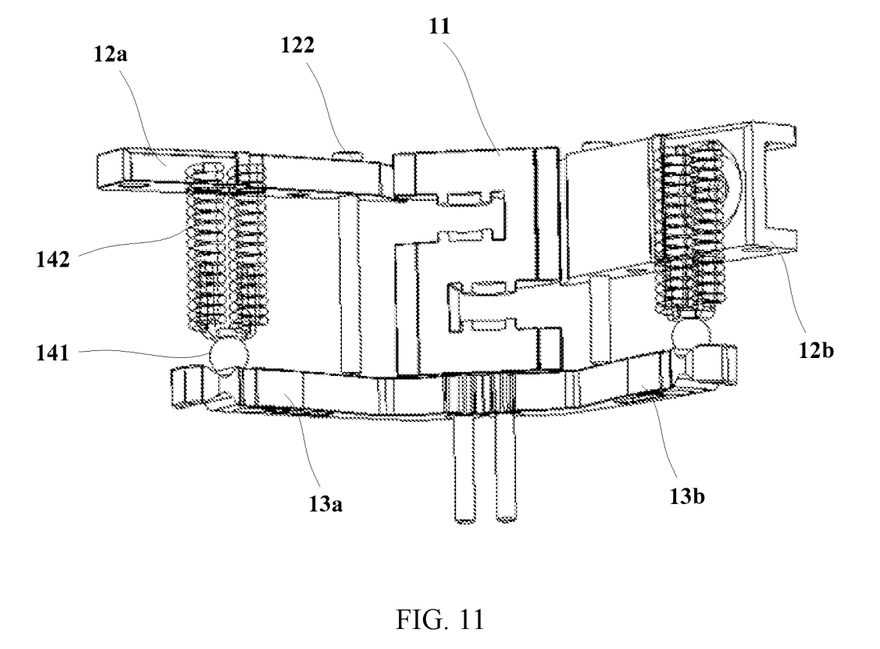
FIG. 11 is a schematic diagram of a structure in which an elastic component, a swing arm, and a synchronization arm cooperate with each other according to an embodiment of this application.
Figure 13:
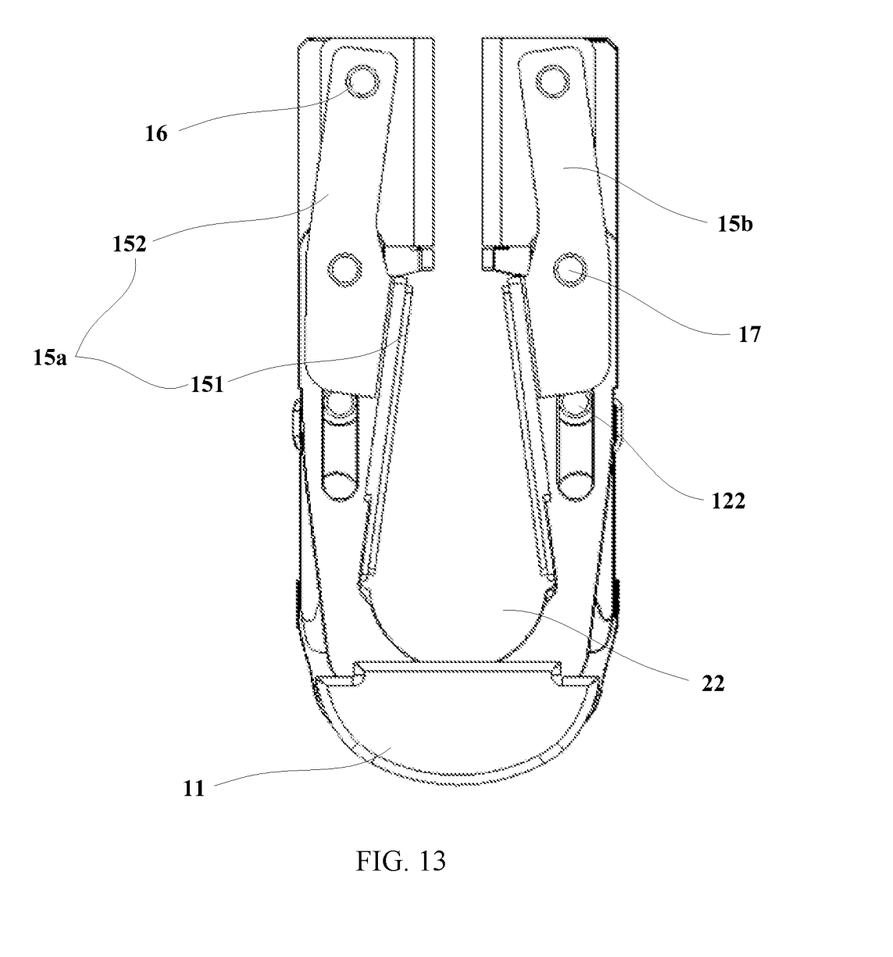
FIG. 13 is a side view of a hinge mechanism in a folded state according to an embodiment of this application.

Still referring to FIG. 10, when the left swing arm 12a is specifically slidably connected to the left synchronization arm 13a, a strip-shaped hole 131 may be disposed in the left synchronization arm 13a, and an extension direction of the strip-shaped hole 131 is the same as an extension direction of the left synchronization arm 13a. In addition, referring to FIG. 11, a sliding part 122 that can slide along the strip-shaped hole 131 is disposed in the left swing arm 12a. Referring to FIG. 11 and FIG. 13, when the sliding part 122 is specifically disposed, the sliding part 122 may be but is not limited to a fastening rod disposed in the left swing arm 12a. In this case, when the left swing arm 12a rotates, the sliding part 122 slides along the strip-shaped hole 131, and also drives the left synchronization arm 13a to rotate. It may be understood that a sliding connection manner between the right swing arm 12b and the right synchronization arm 13b is the same as a sliding connection manner between the left swing arm 12a and the left synchronization arm 13a, and details are not described herein again.

Because a connection manner between the left swing arm 12a and the left synchronization arm 13a is the same as a connection manner between the right swing arm 12b and the right synchronization arm 13b, in the following embodiments, the left swing arm 12a and the left synchronization arm 13a are used as examples to describe a specific connection manner between the left swing arm 12a and the left synchronization arm 13a. Referring to FIG. 11, when the left swing arm 12a is specifically connected to the left synchronization arm 13a, an elastic component is further disposed between the left swing arm 12a and the left synchronization arm 13a. In this case, a plurality of limiting grooves (not shown in the figure) are disposed on a sidewall that is of the left synchronization arm 13a and that faces the left swing arm 12a. The elastic component is disposed between the left swing arm 12a and the left synchronization arm 13a, and includes a ball 141 and an elastic mechanical part 142 abutting against each other. One end of the elastic mechanical part 142 abuts against the left swing arm 12a and the other end abuts against the ball 141, and the ball 141 may roll along the sidewall that is of the left synchronization arm 13a and that is close to the left swing arm 12a. When a folding status of the foldable mobile terminal including the hinge mechanism changes, the left swing arm 12a rotates around the main shaft component 11, and the left synchronization arm 13a rotates accordingly. In addition, the ball 141 may roll along the sidewall of the left synchronization arm 13a under an action of elastic force of the elastic mechanical part 142, and friction occurs between the ball 141 and the sidewall of the left synchronization arm 13a, so that damping force is generated between the left swing arm 12a and the left synchronization arm 13a, thereby optimizing a feel of a user and improving user experience. In addition, because there are a plurality of limiting grooves on the sidewall that is of the left synchronization arm 13a and that is close to the left swing arm 12a, in a rolling process, the ball 141 falls into the limiting groove under an action of the elastic mechanical part 142, so that hover experience can be achieved.

Referring to FIG. 11, when the left swing arm 12a is specifically connected to the elastic component, referring to FIG. 8 and FIG. 9 together, an accommodation groove 123 for accommodating the elastic mechanical part 142 may be disposed in the left swing arm 12a. In this case, the elastic mechanical part 142 may be accommodated in the accommodation groove 123 and abut against a bottom of the accommodation groove 123.

Figure 12:
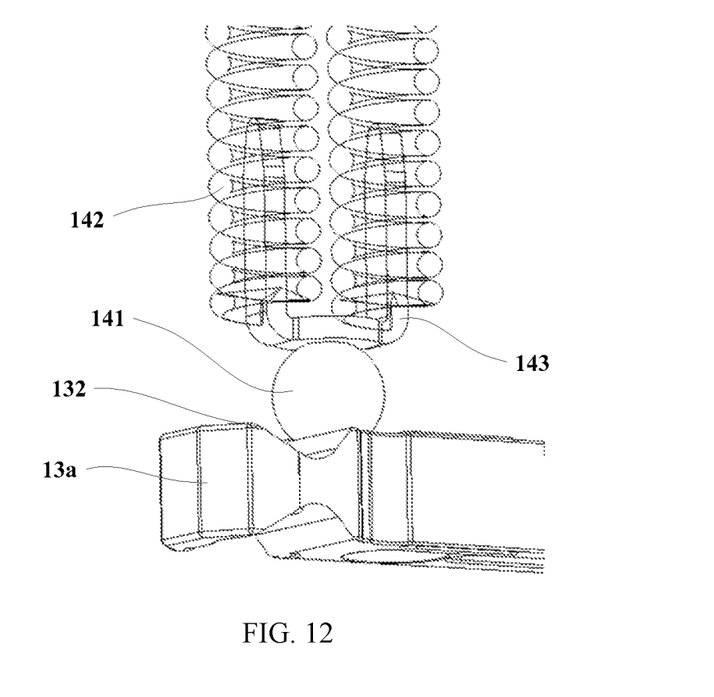
FIG. 12 is a schematic diagram of a partial structure in which an elastic component cooperates with a synchronization arm.

With reference to FIG. 11 and FIG. 12, the elastic mechanical part 142 may be but is not limited to a spring. When the elastic mechanical part 142 is a spring, to limit the spring to prevent the spring from being bent in a moving process, a limiting pillar (not shown in the figure) may be disposed in the accommodation groove, so that the spring sleeves the limiting pillar. In addition, there may be one spring, or as shown in FIG. 12, there may be a plurality of springs disposed in parallel. When there are a plurality of springs disposed in parallel, ends that are of the plurality of springs and that are close to the left synchronization arm 13a are connected by using a U-shaped connector 143. In this case, the ball 141 abuts against an end face of the U-shaped connector 143, and moves along the end face of the U-shaped connector 143. In this way, friction between the elastic mechanical part 142 and the ball 141 can be reduced, so that the ball 141 moves more flexibly.

To better describe a folding process of the foldable mobile terminal including the swing arm component, refer to FIG. 2 to FIG. 5 together. In FIG. 2, the included angle between the left housing 20 and the right housing 30 of the mobile terminal is 180°. Referring to FIG. 11, in this case, the ball 141 falls into a corresponding limiting groove. Referring to FIG. 2, FIG. 5, and FIG. 11, when the included angle between the left housing 20 and the right housing 30 of the mobile terminal needs to be changed from 180° to 0°, the left swing arm 12a rotates around the main shaft component 11, and the left synchronization arm 13a rotates accordingly. In addition, the right synchronization arm 13b and the right swing arm 12b move toward the left synchronization arm 13a and the left swing arm 12a, and the ball 141 rolls along the sidewall of the left synchronization arm 13a. Referring to FIG. 5 and FIG. 11, when the ball 141 falls into a corresponding limiting groove in the case in which the included angle between the left housing 20 and the right housing 30 is 0°, a wall of the limiting groove prevents the ball 141 from continuing to move on the left synchronization arm 13a, so that the left swing arm 12a stops rotating, and the left housing 20 and the right housing 30 of the mobile terminal hover at the included angle of 0°.

Referring to FIG. 11, because there are a plurality of limiting grooves on the sidewall that is of the left synchronization arm 13a and that is close to the left swing arm 12a, the ball 141 may fall into a corresponding limiting groove to implement hovering of the left swing arm 12a at a corresponding rotation position. For example, referring to FIG. 3, FIG. 4, and FIG. 11 together, the included angle between the left housing 20 and the right housing 30 of the mobile terminal may be kept at 90° through proper disposing. In addition, still referring to FIG. 11, in an implementation of this application, when the ball 141 moves between two adjacent limiting grooves, constant friction force is generated between the ball 141 and the left synchronization arm 13a, so that damping between the left swing arm 12a and the left synchronization arm 13a can be constant. In this case, a feel can be constant. In addition, referring to FIG. 2, FIG. 5, and FIG. 11, it should be noted that when limiting grooves are disposed only at positions of the left synchronization arm 13a that correspond to the included angles of 0° and 180° between the left housing 20 and the right housing 30 of the mobile terminal, with reference to FIG. 11 and FIG. 13, when folding the mobile terminal, the user only needs to manually set a relatively small included angle (for example, 30°) between the two housings, so that the ball 141 can enter a limiting groove corresponding to 0° under an action of the elastic mechanical part 142, to implement automatic folding of the mobile terminal. Referring to FIG. 10 and FIG. 11, when unfolding the mobile terminal, the user only needs to manually set a relatively large included angle (for example, 150°) between the two housings, so that the ball 141 can enter a limiting groove corresponding to 180° under an action of the elastic mechanical part 142, to implement automatic unfolding of the mobile terminal. It can be learned that using the hinge mechanism 10 shown in FIG. 6 can implement self-unfolding and self-folding of the foldable mobile terminal, so that user experience is improved.

To form the accommodation space 22 (refer to FIG. 13) that has a flat surface and that is used to accommodate the flexible screen 40 in FIG. 1, referring to FIG. 6, the hinge mechanism 10 further includes a left baffle 15a and a right baffle 15b separately disposed on both sides of the main shaft component 11, the left baffle 15a is connected to the left swing arm 12a, and the right baffle 15b is connected to the right swing arm 12b. Because the left baffle 15a and the right baffle 15b are disposed in a same manner, the left baffle 15a is used as an example herein to describe a structure of the left baffle 15a and a connection between the left baffle 15a and the swing arm. Referring to FIG. 6, the left baffle 15a mainly includes a body 151 and a connection part 152 connected to the body 151, an extension direction of the body 151 is parallel to the extension direction of the main shaft component 11, an extension direction of the connection part 152 is perpendicular to the extension direction of the body 151, there may be two connection parts 152, and the two connection parts 152 are separately disposed at both ends in the extension direction of the body 151. With reference to FIG. 7 and FIG. 13, an end that is of the connection part 152 and that is away from the body 151 may be rotatably connected to the left swing arm 12a by using a rotating pin shaft 16, for example, and an end that is of the connection part 152 and that is close to the body 151 may be connected to the left swing arm 12a by using a driving pin shaft 17, for example. In addition, for a structure of the synchronization arm disposed in a correspondence with the swing arm, refer to FIG. 14. A V-shaped hole 24 is disposed in a left synchronization arm 13c in FIG. 14. In this case, when the left swing arm 12a rotates, the driving pin shaft 17 may move along the V-shaped hole 24, to drive the connection part 152 to rotate by using the rotating pin shaft 16 as a rotation center, so that the body 151 rises or falls accordingly, and further, the accommodation space 22 for accommodating the flexible screen 40 shown in FIG. 1 can be formed by the main shaft component 11 and bodies 151 on both sides in a folding process of the foldable mobile terminal and the accommodation space 22 has a relatively flat surface, thereby reducing damage to the flexible screen 40.

It should be noted that when one synchronization arm is disposed at each end of one swing arm, V-shaped holes 24 are disposed in the left synchronization arm 13c and a right synchronization arm 13d at one end, referring to FIG. 14, and no V-shaped hole is disposed in the left synchronization arm 13a and the right synchronization arm 13b at the other end, referring to FIG. 10. In this case, a plurality of limiting grooves may be disposed on sides that are of the left synchronization arm 13a and the right synchronization arm 13b in FIG. 10 and that are close to swing arms, but no limiting groove is disposed on sides that are of the left synchronization arm 13c and the right synchronization arm 13d in FIG. 14 and that are close to swing arms, so that an elastic component is disposed only between each of the left synchronization arm 13a and the right synchronization arm 13b shown in FIG. 10 and a swing arm on a corresponding side, and no elastic component is disposed between the left synchronization arm 13c or the right synchronization arm 13d shown in FIG. 14 and a swing arm on a corresponding side. It may be understood that the foregoing implementation is merely an example of disposing the synchronization arm, and limiting grooves may be alternatively disposed in synchronization arms at both ends of the swing arm, and elastic components are disposed between the swing arms and the synchronization arms, so that a damping function between the swing arm and the synchronization arm is increased.

According to a second aspect, a foldable mobile terminal is provided. Referring to FIG. 1, the mobile terminal includes the hinge mechanism 10, the left housing 20, the right housing 30, and the flexible screen 40 connected to the left housing 20 and the right housing 30. The flexible screen 40 may be connected to the left housing 20 and the right housing 30 by using adhesives, for example. Referring to FIG. 1 and FIG. 6 together, the left housing 20 and the right housing 30 are separately disposed on both sides of the hinge mechanism 10, the left housing 20 is fastened to the left swing arm 12a located on a left side, and the right housing 30 is fastened to the right swing arm 12b located on a right side. A specific fastening manner may be but is not limited to a connection using a fastener such as a bolt or a screw. During use of the mobile terminal, when rotation of the left housing 20 drives the left swing arm 12a to rotate around the main shaft component 11, the left synchronization arm 13a rotates accordingly, so that the right synchronization arm 13b and the right swing arm 12b are driven to rotate, and further, the left housing 20 and the right housing 30 of the foldable mobile terminal can move synchronously, and therefore, both sides of the flexible screen 40 move synchronously, and force of the flexible screen 40 is relatively even. In addition, because the left swing arm 12a and the right swing arm 12b on both sides of the main shaft component 11 rotate around different axes, through such a design, the accommodation space 22 that can accommodate the flexible screen 40 can be formed during rotation of the left swing arm 12a and the right swing arm 12b, so that a probability that the flexible screen 40 is damaged can be reduced.

Still referring to FIG. 1 and FIG. 6, when the left housing 20 is specifically connected to the left swing arm 12a, a left bracket 18a may be disposed between the left housing 20 and the left swing arm 12a. In this case, the left bracket 18a may be first fastened to the left swing arm 12a by using a fastener such as a bolt or a screw, and then the left housing 20 and the left bracket 18a are fastened by using a fastener, so that the left housing 20 is connected to the left swing arm 12a. It may be understood that the foregoing embodiment provides only an example of connecting the left housing 20 to the left swing arm 12a, and the left housing 20 may be connected to the left swing arm 12a in another manner. In addition, a manner of connecting the right housing 30 to the right swing arm 12b by using a right bracket 18b is the same as that on the left side, and details are not described herein again.

Figure 15:
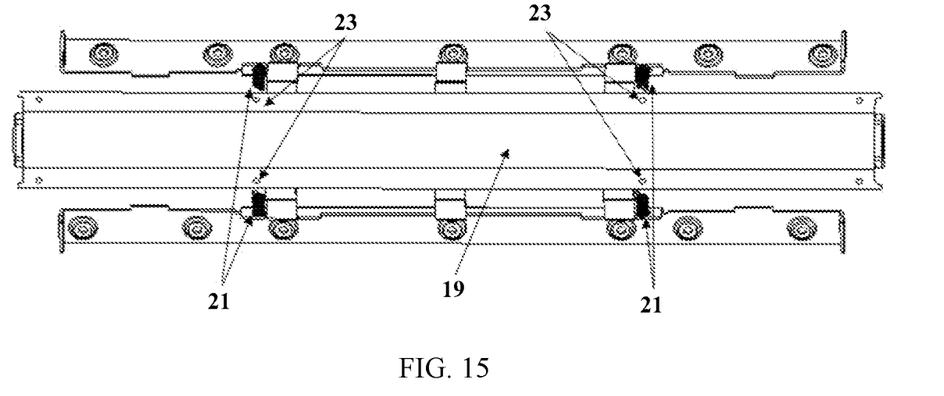
FIG. 15 is a schematic diagram of an exploded structure of a hinge mechanism according to another embodiment of this application.

Referring to FIG. 1, for ease of describing the structure of the foldable mobile terminal, in this application, a side of the foldable mobile terminal on which the flexible screen 40 is disposed is defined as a folding inner side of the mobile terminal, and a side opposite to the side is defined as a folding outer side of the mobile terminal. When the mobile terminal is specifically disposed, referring to FIG. 6 and FIG. 15 together, the mobile terminal further includes an appearance protection part 19 disposed on the folding outer side. The appearance protection part 19 is fastened to the brackets on both sides of the main shaft component 11 by using elastic mechanisms 21. The elastic mechanism 21 may be but is not limited to a spring. When the appearance protection part 19 is specifically connected to the bracket, mounting holes 23 may be correspondingly disposed in the appearance protection part 19 and the bracket, and hooks may also be disposed at both ends of the elastic mechanism 21. In this case, the appearance protection part 19 may be connected to the bracket by separately disposing the hooks in corresponding mounting holes 23. With reference to FIG. 4 and FIG. 5, in a folding process of the foldable mobile terminal, the appearance protection part 19 and the two housings fit with the hinge mechanism 10, so that an appearance of the foldable mobile terminal can be simple and beautiful while the hinge mechanism 10 is prevented because the hinge mechanism 10 is prevented from being exposed to the folding outer side of the mobile terminal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A hinge mechanism, applied to a foldable mobile terminal, wherein the hinge mechanism comprises:
   a main shaft component;
   a swing arm component, comprising at least one swing arm group, wherein each swing arm group comprises swing arms correspondingly disposed on both sides of the main shaft component, the swing arm component is rotatably connected to the main shaft component, and axes around which the swing arms on both sides of the main shaft component rotate are different and are separately parallel to an extension direction of the main shaft component; and a synchronization component, wherein the synchronization component and the swing arm component are correspondingly disposed, the synchronization component comprises synchronization arms separately disposed on both sides of the main shaft component, and two synchronization arms are geared; and each synchronization arm is slidably connected to a swing arm on a same side as the synchronization arm, and is configured to rotate with the swing arm on the corresponding side, and wherein axes around which a swing arm and a synchronization arm disposed on a same side rotate coincide.

2. The hinge mechanism according to claim 1, wherein in the extension direction of the main shaft component, the swing arms are disposed in a one-to-one correspondence with the synchronization arms, or one synchronization arm of the synchronization arms is disposed at each end of the swing arm; and a strip-shaped hole is disposed in each of the synchronization arms, an extension direction of the strip-shaped hole is the same as an extension direction of the synchronization arm, and a sliding part that can slide along the strip-shaped hole is disposed in the swing arm.

3. The hinge mechanism according to claim 2, wherein the sliding part includes a fastening rod disposed in the swing arm.

4. The hinge mechanism according to claim 1, wherein a swing arm mounting groove is disposed in the main shaft component, a protrusion is disposed on a wall of the swing arm mounting groove, and the protrusion has an arc-shaped support surface; and a support shaft is disposed at an end of the swing arm and is connected to the main shaft component, and the support shaft is in contact with the arc-shaped support surface, and is configured to rotate along the arc-shaped support surface.

5. The hinge mechanism according to claim 1, wherein the hinge mechanism further comprises baffles separately disposed on both sides of the main shaft component, and a V-shaped hole is further disposed in each synchronization arm; and the baffle comprises a body and a connection part connected to the body, an extension direction of the baffle is parallel to the extension direction of the main shaft component, and an extension direction of the connection part is perpendicular to the extension direction of the body; an end of the connection part that is away from the body is rotatably connected to the swing arm using a rotating pin shaft, and an end of the connection part that is close to the body is connected to the swing arm using a driving pin shaft; and the swing arm rotates to enable the driving pin shaft to move along the V-shaped hole, to drive the connection part to rotate around the rotating pin shaft, so that accommodation space for accommodating a flexible screen is formed by the main shaft component and bodies on both sides.

6. The hinge mechanism according to claim 1, wherein a plurality of limiting grooves are disposed on a sidewall of each synchronization arm facing the swing arm; and the hinge mechanism further comprises an elastic component, the elastic component is disposed between a swing arm and a synchronization arm on a same side as the elastic component, and comprises a ball and an elastic mechanical part abutting against each other, one end of the elastic mechanical part abuts against the swing arm and the other end abuts against the ball, and the ball is configured to roll along a sidewall of the synchronization arm that is close to the swing arm.

7. The hinge mechanism according to claim 6, wherein an accommodation groove for accommodating the elastic mechanical part is disposed in the swing arm, and the elastic mechanical part is accommodated in the accommodation groove and abuts against a bottom of the accommodation groove.

8. The hinge mechanism according to claim 7, wherein the elastic mechanical part comprises a plurality of springs disposed in parallel, and ends of the plurality of springs that are connected to the synchronization arm are connected.

9. The hinge mechanism according to claim 8, wherein a limiting pillar is disposed in the accommodation groove, and each of the plurality of springs sleeves the limiting pillar; and the ends of the plurality of springs that are close to the synchronization arm are connected using a U-shaped connector, and the roll abuts against an end face of the U-shaped connector.

10. A foldable mobile terminal, comprising the hinge mechanism according to claim 1, two housings, and a flexible screen fastened to the two housings, wherein the two housings are separately disposed on both sides of the hinge mechanism, and each housing is fastened to the swing arm on a same side as the housing.

11. The mobile terminal according to claim 10, further comprising brackets separately disposed on both sides of the main shaft component, wherein each bracket is configured to connect a swing arm and a housing on a corresponding side.

12. The mobile terminal according to claim 11, further comprising an appearance protection part, wherein the appearance protection part is disposed on a folding outer side of the mobile terminal, and is separately connected to the brackets on both sides of the main shaft component by elastic mechanisms.

13. A hinge mechanism, applied to a foldable mobile terminal, wherein the hinge mechanism comprises:

a main shaft component;

a swing arm component, comprising at least one swing arm group, wherein each swing arm group comprises swing arms correspondingly disposed on both sides of the main shaft component, the swing arm component is rotatably connected to the main shaft component, and axes around which the swing arms on both sides of the main shaft component rotate are different and are separately parallel to an extension direction of the main shaft component; and a synchronization component, wherein the synchronization component and the swing arm component are correspondingly disposed, the synchronization component comprises synchronization arms separately disposed on both sides of the main shaft component, and two synchronization arms are geared; and each synchronization arm is slidably connected to a swing arm on a same side as the synchronization arm, and is configured to rotate with the swing arm on the corresponding side, wherein the hinge mechanism further comprises baffles separately disposed on both sides of the main shaft component, and a V-shaped hole is further disposed in each synchronization arm; and the baffle comprises a body and a connection part connected to the body, an extension direction of the baffle is parallel to the extension direction of the main shaft component, and an extension direction of the connection part is perpendicular to the extension direction of the body; an end of the connection part that is away from the body is rotatably connected to the swing arm using a rotating pin shaft, and an end of the connection part that is close to the body is connected to the swing arm using a driving pin shaft; and the swing arm rotates to enable the driving pin shaft to move along the V-shaped hole, to drive the connection part to rotate around the rotating pin shaft, so that accommodation space for accommodating a flexible screen is formed by the main shaft component and bodies on both sides.

14. A foldable mobile terminal, comprising the hinge mechanism according to claim 13, two housings, and a flexible screen fastened to the two housings, wherein the two housings are separately disposed on both sides of the hinge mechanism, and each housing is fastened to the swing arm on a same side as the housing.

15. A hinge mechanism, applied to a foldable mobile terminal, wherein the hinge mechanism comprises:
   a main shaft component;
   a swing arm component, comprising at least one swing arm group, wherein each swing arm group comprises swing arms correspondingly disposed on both sides of the main shaft component, the swing arm component is rotatably connected to the main shaft component, and axes around which the swing arms on both sides of the main shaft component rotate are different and are separately parallel to an extension direction of the main shaft component; and
   a synchronization component, wherein the synchronization component and the swing arm component are correspondingly disposed, the synchronization component comprises synchronization arms separately disposed on both sides of the main shaft component, and two synchronization arms are geared; and each synchronization arm is slidably connected to a swing arm on a same side as the synchronization arm, and is configured to rotate with the swing arm on the corresponding side,
   wherein a plurality of limiting grooves are disposed on a sidewall of each synchronization arm facing the swing arm; and
   the hinge mechanism further comprises an elastic component, the elastic component is disposed between a swing arm and a synchronization arm on a same side as the elastic component, and comprises a ball and an elastic mechanical part abutting against each other, one end of the elastic mechanical part abuts against the swing arm and the other end abuts against the ball, and the ball is configured to roll along a sidewall of the synchronization arm that is close to the swing arm.

16. The hinge mechanism according to claim 15, wherein an accommodation groove for accommodating the elastic mechanical part is disposed in the swing arm, and the elastic mechanical part is accommodated in the accommodation groove and abuts against a bottom of the accommodation groove.

17. The hinge mechanism according to claim 16, wherein the elastic mechanical part comprises a plurality of springs disposed in parallel, and ends of the plurality of springs that are connected to the synchronization arm are connected.

18. The hinge mechanism according to claim 17, wherein a limiting pillar is disposed in the accommodation groove, and each of the plurality of springs sleeves the limiting pillar; and
   the ends of the plurality of springs that are close to the synchronization arm are connected using a U-shaped connector, and the roll abuts against an end face of the U-shaped connector.

19. A foldable mobile terminal, comprising the hinge mechanism according to claim 15, two housings, and a flexible screen fastened to the two housings, wherein the two housings are separately disposed on both sides of the hinge mechanism, and each housing is fastened to the swing arm on a same side as the housing.

* * * * *

UNITED STATES PATENT AND TRADEMARK OFFICE
CERTIFICATE OF CORRECTION

Page 1 of 1

PATENT NO.        : 12,081,686 B2
APPLICATION NO.   : 17/561403
DATED             : September 3, 2024
INVENTOR(S)       : Nagai et al.

It is certified that error appears in the above-identified patent and that said Letters Patent is hereby corrected as shown below:

On the Title Page

Item (71) Applicants: "Kanagawa (JP)" should read -- Yokohama (JP) --.

Signed and Sealed this
Sixth Day of May, 2025

Coke Morgan Stewart
*Acting Director of the United States Patent and Trademark Office*